Patented Feb. 11, 1947

2,415,662

UNITED STATES PATENT OFFICE 2,415,662

DISTILLATION OF ACRYLONITRILE FROM ACETONITRILE

John W. Teter and Walter J. Merwin, Chicago, Ill., assignors to Sinclair Refining Company, New York, N. Y., a corporation of Maine No Drawing. Application October 6, 1943, Serial No. 505,197

4 Claims. (Cl. 202—42)

This method relates to the purification and separation of nitriles. It relates more particularly to an improved method of effecting the separation of substantially pure acrylonitrile from mixtures comprising acrylonitrile and acetonitrile.

Certain known processes, primarily for the production of acrylonitrile, result in a crude product containing, along with the acrylonitrile, substantial amounts of acetonitrile. Due to the small temperature difference between the boiling point of acrylonitrile and that of acetonitrile the direct separation thereof in a high state of purity has heretofore been an expensive and troublesome undertaking.

The boiling point of pure acrylonitrile is 78° C. and that of pure acetonitrile is 82° C. Acrylonitrile contaminated by the presence of acetonitrile may be separated from the crude product by direct fractional distillation but where a high state of purity is required it has been necessary to subject the acrylonitrile distillate to further treatment.

Our present invention provides a method whereby acrylonitrile substantially free from acetonitrile may be directly recovered from a crude product containing substantial proportion of acetonitrile by fractional distillation. Our improved process comprises the separation of the acrylonitrile from the mixture by distillation in the presence of water.

We have discovered that acrylonitrile and acetonitrile each forms an azeotrope with water in the presence of the other and that the temperature differences in boiling points of the respective azeotropes is substantially greater than that of the nitriles alone. The boiling point of the acrylonitrile-water azeotrope is 69.5° C. while that of the acetonitrile-water azeotrope is 75.5° C. Thus the difference in boiling points of the respective azeotropes is 6° C. while that of the pure nitriles is only 4° C. Though this difference in boiling points is not great, it has been found to be sufficiently large to make possible and practical the direct separation of acrylonitrile substantially free from acetonitrile by fractional distillation. After separation of the azeotropes the respective nitriles may be dehydrated if desired by any suitable method.

Acrylonitrile is relatively insoluble in water and accordingly the water may be effectively separated from the acrylonitrile fraction by cooling the distillate to about room temperature or lower, whereby a water layer and an acrylonitrile layer are formed, and decanting off the water layer. A small proportion of the acrylonitrile of the order of 2 to 3 per cent may remain in the water layer. However, loss of this material is substantially avoided by recycling the water containing residual acrylonitrile, and mixing it with additional crude nitrile mixtures to form further azeotropes.

The difficulty generally experienced in the separation of acrylonitrile from acetonitrile is illustrated by the results of a close fractional distillation in a 9.5 millimeter Stedman column of a synthetic mixture prepared from equal volumes of substantially pure acrylonitrile and acetonitrile, the refractive index of which at 20° C. were respectively 1.3916 and 1.3440. In this distillation neither pure acrylonitrile or pure acetonitrile were obtained. A mixture of the nitrile started to distill off at 76° C. The initial distillate had a refractive index at 20° C. of 1.3850. The vapor temperature gradually rose to 80° C. and the refractive index gradually dropped to 1.3515. The nitrogen content of the initial distillate was 25.6% and this gradually rose to 30.6%. The purest acrylonitrile fraction thus obtained had a refractive index at 20° C. of 1.3850 and contained 13.6% by weight of acetonitrile. In this distillation 82.5 volume per cent of the mixture was distilled.

In repeating the experiment using an one inch Stedman column the highest refractive index obtained was 1.3880, corresponding to that of acrylonitrile at a purity of 93%. There was considerable overlapping between the acrylonitrile and acetonitrile fractions. However at 75 volume per cent distilled off some substantially pure acetonitrile was obtained.

Our improved method of separating acrylonitrile from mixtures thereof with acetonitrile and the advantages derived from the use of our present invention will be illustrated by the following examples.

Example 1

A synthetic mixture prepared by mixing 250 cc. of substantially pure acrylonitrile, having a refractive index of 1.3913, and 250 cc. of substantially pure acetonitrile, having a refractive index of 1.3440, each at 20° C., was admixed with 75 cc. of water having at 20° C. a refractive index of 1.3334 and the whole subjected to fractional distillation in an one inch Stedman column. At a constant temperature of 69.5° C. the acrylonitrile-water fraction was distilled off and, after separation of the water layer by decantation, the acrylonitrile layer was found to have a refractive index at 20° C. of 1.3902. After this fraction had been distilled off the temperature rose sharply to 75–75.5° C. and the acetonitrile water azeotrope was distilled off at a substantially constant temperature.

*Example II*

875 cc. (694 grams) of an impure acrylonitrile fraction from a previous fractional distillation, containing a substantial amount of acetonitrile, have a refractive index at 20° C. of 1.3781 and an acrylonitrile content of 69%, as indicated by the permanganate analysis, was subjected to fractional distillation in an one inch Stedman column. From this distillation there was obtained, at a temperature of 77–81° C., 276 cc. (222 grams) of an intermediate cut consisting primarily of a mixture of acrylonitrile and acetonitrile and having a refractive index varying from 1.3889 to 1.3470 at 20° C. as indicated by examination of 2% fractions. 42 cc. of water was added to this intermediate cut and the mixture subjected to redistillation in an one inch Stedman column. Upon cooling to room temperature, the distillate passing off at a temperature of 69.5–70.5° C. separated into an upper acrylonitrile layer having a refractive index at 20° C. of 1.3909 and a lower layer consisting primarily of water. From this redistillation and decantation about 112 grams of acrylonitrile substantially free from acetonitrile and having a refractive index at 20° C. of 1.3909 and containing 2.24% water was obtained. Following the distillation of this acrylonitrile fraction the temperature rose rather sharply to the boiling point of the acetonitrile-water azeotrope and finally to about 80–81° C., insufficient water being left to form the azeotrope with all of the acetonitrile present.

*Example III*

To 139 cc. (108 grams) of a mixture consisting primarily of acrylonitrile and acetonitrile and having a refractive index at 20° C. of 1.3788, there was added 20 cc. of water and the whole was subjected to close fractional distillation. At a relatively constant temperature of 69–70.5° C. the acrylonitrile-water azeotrope was distilled off. This azeotrope fraction separated into a lower water layer and an upper nitrile layer upon cooling to room temperature, the latter having a refractive index at 20° C. of 1.3899. 61 grams of the acetonitrile-free acrylonitrile was thus obtained. After drying the acrylonitrile fraction was found to have a refractive index at 20° C. of 1.3905, indicating substantial purity. Following the distillation of the acrylonitrile-water azeotrope, the temperature rose rather sharply to the boiling point of the acetonitrile-water azeotrope and finally to about 80–81° C., insufficient water being left to form the azeotrope with all of the acetonitrile present.

The invention provides a particularly advantageous method for separating acrylonitrile from mixtures consisting primarily of acrylonitrile and acetonitrile. It is also applicable to the separation of substantially pure acrylonitrile from crude products containing, in addition to those nitriles, a substantial proportion of propionitrile. The application of our invention is illustrated by the following example.

*Example IV*

1,000 cc. of a crude stabilized, acrylonitrile product, resulting from the dehydrogenation of propionitrile, and consisting primarily of acrylonitrile, acetonitrile, and unconverted propionitrile, was subjected to close fractional distillation in a one inch Stedman column with 75 cc. of water. 34½% of the charge was distilled off within the temperature range of 67.5 to 80.5° C. The distillate obtained in this range, upon cooling to room temperature, separated into an upper layer consisting primarily of nitrile and a lower, water layer. The upper layer of the cut obtained at 67.5–72° C. was found to have a refractive index at 20° C. of 1.3880 and was composed of relatively pure acrylonitrile containing a small amount of water. The upper layer of that portion of the cut obtained in this temperature range at 10 to 14 per cent off had a refractive index at 20° C. of 1.3910 indicating it to be substantially pure acrylonitrile.

Immediately following the distillation of the acrylonitrile fraction the temperature rose sharply to 78° C. at 18% off and from thence gradually rose to 80.5° C. at 36% off. The upper layer of the intermediate fraction obtained in this temperature range was found to have a refractive index at 20° C. of 1.3680 and to consist largely of acetonitrile and water.

Immediately following the distillation of this intermediate fraction the temperature rose sharply to 96° C. at about 38% off and remained constant up to 87% off where the distillation was discontinued. This final fraction did not separate on cooling to room temperature and was found to have a refractive index at 20° C. of 1.3661. The distillation temperature, refractive index and nitrogen content of this final fraction indicated it to be substantially pure propionitrile.

In the absence of water the recovery of acrylonitrile from such crude products of dehydrogenation by direct fractional distillation has been found to be much less complete.

The optimum proportion of water to be added will vary considerably depending upon the composition of the nitrile mixture being distilled and the extent of fractionation desired. Proportions such as those used in the preceding specific examples have been found advantageous. In the distillation of a synthetic mixture, such as described in Example I, 35 cc. of water, for example, was found to be insufficient for complete separation of the acrylonitrile from the acetonitrile.

The acrylonitrile-water azeotrope has been found to contain about 13% water, by weight, and the acetonitrile-water azeotrope has been found to contain about 16% water. From these values the approximate amount of water required may be readily calculated from a knowledge of the approximate composition of the material to be distilled.

Sufficient water may be added to form an azeotrope with the acrylonitrile only or sufficient water may be added to form the azeotrope with the acetonitrile as well as the acrylonitrile.

Our present invention contemplates either batch or continuous operation. In either type of operation the water layer of the acrylonitrile distillate is with advantage recycled to the distillation zone to carry off therefrom additional acrylonitrile. Intermediate fractions may also be recycled for further purification. By thus recycling the water layer and intermediate fractions substantially complete recovery of the acrylonitrile in a substantially pure state may be effected.

We claim:

1. A process for separating acrylonitrile from mixtures containing both acrylonitrile and acetonitrile which comprises fractionally distilling the mixture in the presence of water.

2. A process for separating acrylonitrile from mixtures containing both acrylonitrile and acetonitrile which comprises adding water to the mixture and distilling off the acrylonitrile as an azeotrope with the water.

3. A process for separating acrylonitrile and acetonitrile from mixtures containing these materials which comprises subjecting the mixture to fractional distillation in the presence of water.

4. A process for separating acrylonitrile from mixtures containing both acrylonitrile and acetonitrile which comprises subjecting the mixture to fractional distillation in the presence of water, distilling off a fraction comprising acrylonitrile and water, cooling the fraction, whereby the distillate is separated into an upper layer consisting principally of acrylonitrile and a lower layer consisting principally of water and returning the lower layer to the fractional distillation.

JOHN W. TETER.
WALTER J. MERWIN.

REFERENCES CITED

The following references are of record in the file of this patent:

Morton, Laboratory Technique in Organic Chemistry, published 1938 by McGraw Hill Book Co. Inc. (Copy in Div. 25, pages 124–133, 141, 142.)

Lecat, "Demixtion D'Azeotropes," Jour. de Chemie Physique, vol. 27, pages 75, 76, 77. (Copy in Scientific Library.)